United States Patent [19]
O'Connor et al.

[11] Patent Number: 5,958,054
[45] Date of Patent: Sep. 28, 1999

[54] SYSTEM AND METHOD FOR EMULATING AN UNINTERRUPTABLE POWER SUPPLY (UPS) USING A PORTABLE COMPUTER

[75] Inventors: Clint H. O'Connor, Austin; John J. Pearce, Del Valle, both of Tex.

[73] Assignee: Dell U.S.A., L.P., Round Rock, Tex.

[21] Appl. No.: 08/785,517

[22] Filed: Jan. 17, 1997

[51] Int. Cl.$^6$ ............................... G06F 1/30; G06F 3/00; H02J 7/00

[52] U.S. Cl. ........................... 713/300; 395/500; 714/14; 307/64; 364/528.28; 364/528.32

[58] Field of Search .............................. 395/500, 750.01, 395/182.12; 364/483, 492, 578, 528.27, 528.28, 528.32, 528.33; 307/64–67

[56] References Cited

PUBLICATIONS

Andrew S. Tanenbaum, Structured Computer Organization, Third Edition, pp. 11–23, 1990.

*Primary Examiner*—Glenn A. Auve
*Assistant Examiner*—Sumati Lefkowitz
*Attorney, Agent, or Firm*—Skjerven, Morrill, MacPherson, Franklin & Friel LLP; Ken J. Koestner

[57] ABSTRACT

A portable computer including a chargeable battery and an AC line adapter controls the battery and adapter to emulate a full UPS-class device. A controller of the portable computer with the chargeable battery and the AC line adapter emulates the conventional operation of an uninterruptable power supply (UPS) and a serial cable connecting the UPS to the portable computer. The controller includes a software driver and Basic Input/Output System (BIOS) program code to emulate signals to and from the internal battery and the AC charger.

48 Claims, 8 Drawing Sheets

PRIOR ART

SYSTEM AND METHOD FOR EMULATING AN UNINTERRUPTABLE POWER SUPPLY (UPS) USING A PORTABLE COMPUTER

BACKGROUND OF THE INVENTION

1. Field of the Invention

The present invention relates to uninterruptable power supply (UPS) systems. More specifically, the present invention relates to a system and operating method using a portable computer system to emulate the operations of a UPS.

2. Description of the Related Art

A server is a computer which manages common data and peripherals such as mass data storage devices, printers and modems, and supplies the common data in a network of multiple nodes connected to workstations. The common data is typically the most valuable asset in a network and the server, as manager of the data and peripherals, is charged with the responsibility for the integrity and protection of the data. A server common fulfills this responsibility through the usage of an Uninterruptable Power Supply (UPS) to maintain reliable operation and data storage through brownout and AC line dropout conditions.

Figure 1:
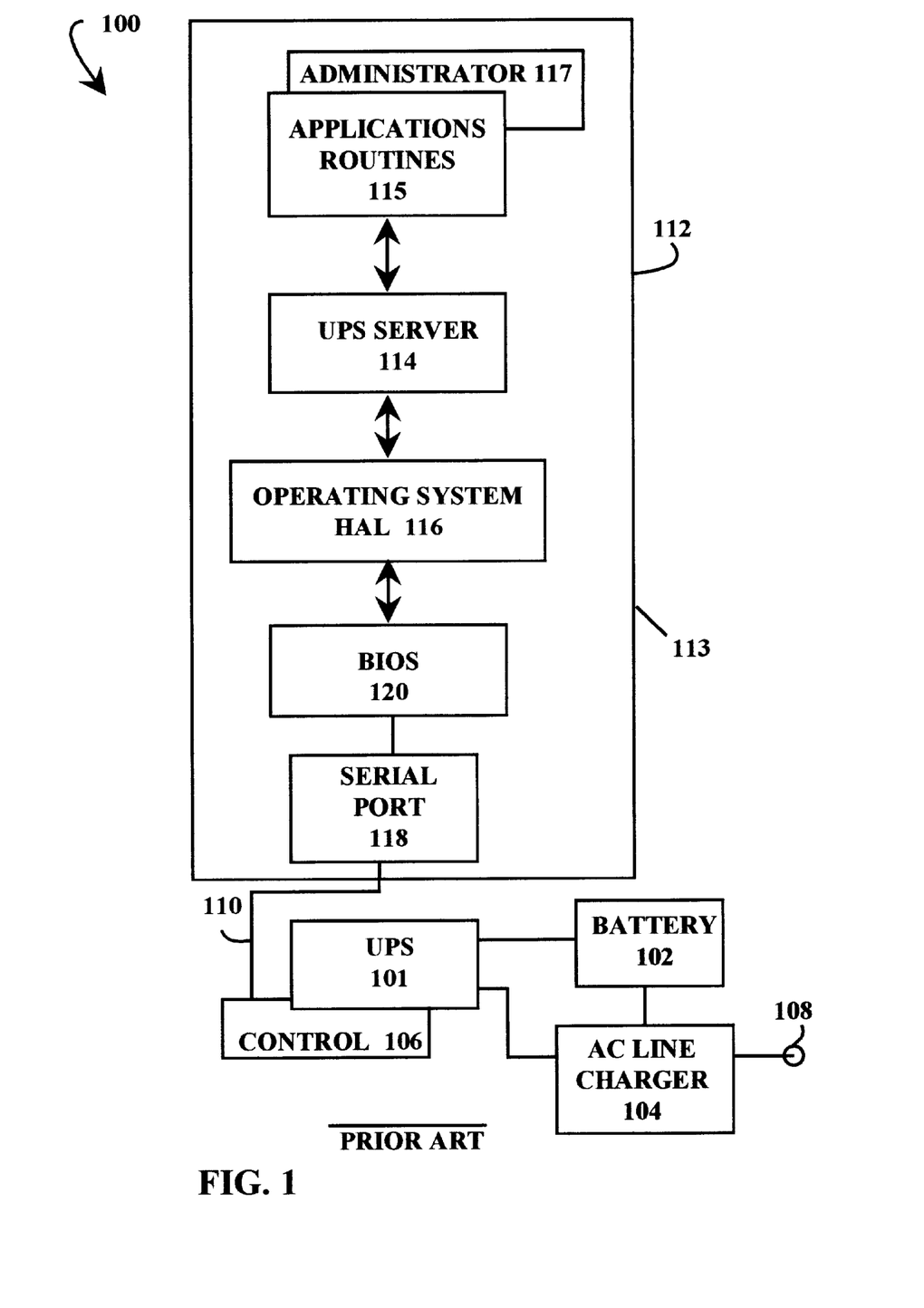
FIG. 1, labeled prior art, is a block diagram illustrating a conventional uninterruptable power supply (UPS).

A UPS is a device that is independent from other components and subsystems in the network and is connected into the network to protect common network data. FIG. 1, labeled prior art, is a block diagram illustrating a conventional UPS control system 100. The UPS control system 100 includes an Uninterruptable Power Source (UPS) 101 with a rechargeable battery 102, an AC line charger 104 connected to charge the battery 102 from the AC line source 108, and an electronic control circuit 106 for regulating charging of the battery 102 and selecting the source of operating power between the battery 102 and the AC line source 108. Various types of rechargeable batteries may be used, such as nickel-cadmium (NiCad) batteries. More advanced versions of uninterruptable power supplies, such as the illustrative UPS control system 100, include a serial cable 110 for communicating signals generated by the electronic control circuit 106 to a server 112. The serial cable 110 commonly uses a custom design cable protocol, rather than a standard cable protocol such as the RS-232 standard.

The server 112 includes a computer 113 executing software including a UPS server software 114 and applications routines 115. An administrator 117 is an application routine 115 that exercises control over the application routines 115 and the server 112. The UPS server software 114 operates in conjunction with a server operating system 116 to receive signals at a serial port 118 via the serial cable 110 that are indicative of a UPS low battery status condition of the battery 102 and an AC line status condition of the AC line source 108. The server operating system 116 includes a system Basic Input/Output System (BIOS) 120 that controls various communication tasks. Among other tasks, the BIOS 120 controls the communication between the UPS server software 114 and the serial port 118.

In response to predetermined conditions of the UPS low battery status and the AC line status, the UPS server software 112 may generate a signal directing the UPS 101 to shutdown, either a partial or total shutdown. The electronic control circuit 106 drives the nonstandard protocol of the serial cable 110, typically by forcing selected line signals to high and low states which are detected by the UPS server software 114.

The conventional UPS control system 100 operates by responding to signals generated by the UPS 101. For example, when the AC power fails, the UPS 101 asserts a predetermined signal on the serial cable 110. The signal on the serial cable 110 is transmitted to the serial port 118 and, through the operation of the BIOS 120, activates a routine executing in the UPS server software 114. The UPS server software 114 sends a message to the applications routines 115 informing the applications that the system is to be shut down. Alternatively, the UPS server software 114 sends a message to the administrator 117 that the AC line power has failed.

When the UPS 101 detects a low battery condition, the UPS 101 asserts a predetermined signal on the serial cable 110 that is indicative of the low battery condition and requests shutdown of the server 112. The UPS server software 114 responds to the low battery condition signal by sending a notification to the applications routines 115 that shutdown in imminent and transmits a signal to the UPS 101 requesting termination of power. The applications respond to this signal by saving data and status information in a nonvolatile storage prior to system shutdown.

SUMMARY OF THE INVENTION

Portable computers have reached parity with desktop computers in many aspects of performance, memory size, and storage capabilities. It has been discovered that the technological advancements in portable computers can be exploited to introduce portable computers to an entirely new area of application as light-duty network servers. The maintenance of continuous operation throughout occurrences of brownouts and AC line dropouts is an objective of both server-class computers and portable computers.

A portable computer with a rechargeable battery installed and an AC line charger connected to a powered AC line is naturally immune from power line failures of a limited duration. However, this natural immunity has little advantage for extended AC line outages in which AC power is not restored before the battery charge expires, causing the portable computer to crash, data loss, and loss of service to all users. In accordance with an embodiment of the present invention, the natural immunity from power loss of a portable computer is enhanced by adding control features which are conventionally associated with an external UPS. These features include the generation of signals notifying the portable computer operating system of battery and AC line conditions. These features also include the control of orderly server system shutdown operations.

In accordance with an embodiment of the present invention, a portable computer including a chargeable battery and an AC line adapter controls the battery and adapter to emulate a full UPS-class device.

In accordance with an embodiment of the present invention, a controller of a portable computer with a chargeable battery and an AC line adapter emulates the conventional operation of an uninterruptable power supply (UPS) and a serial cable connecting the UPS to the portable computer. The controller includes a software driver and Basic Input/Output System (BIOS) program code to emulate signals to and from the internal battery and the AC charger.

Many advantages are achieved by the described UPS emulation system and operating method. One advantage is that the incorporation of special software routines alone is highly useful for enhancing the operation of a portable computer to include an uninterruptable power supply (UPS) functionality. A second advantage is that the functionality of a UPS system is greatly enhanced using the described system to adapt the response of the UPS to a current battery charge level. It is further advantageous that a portable computer is converted for usage as a UPS.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings. The use of the same reference symbols in different drawings indicates similar or identical items.

DESCRIPTION OF THE ILLUSTRATIVE EMBODIMENT(S)

Figure 2:
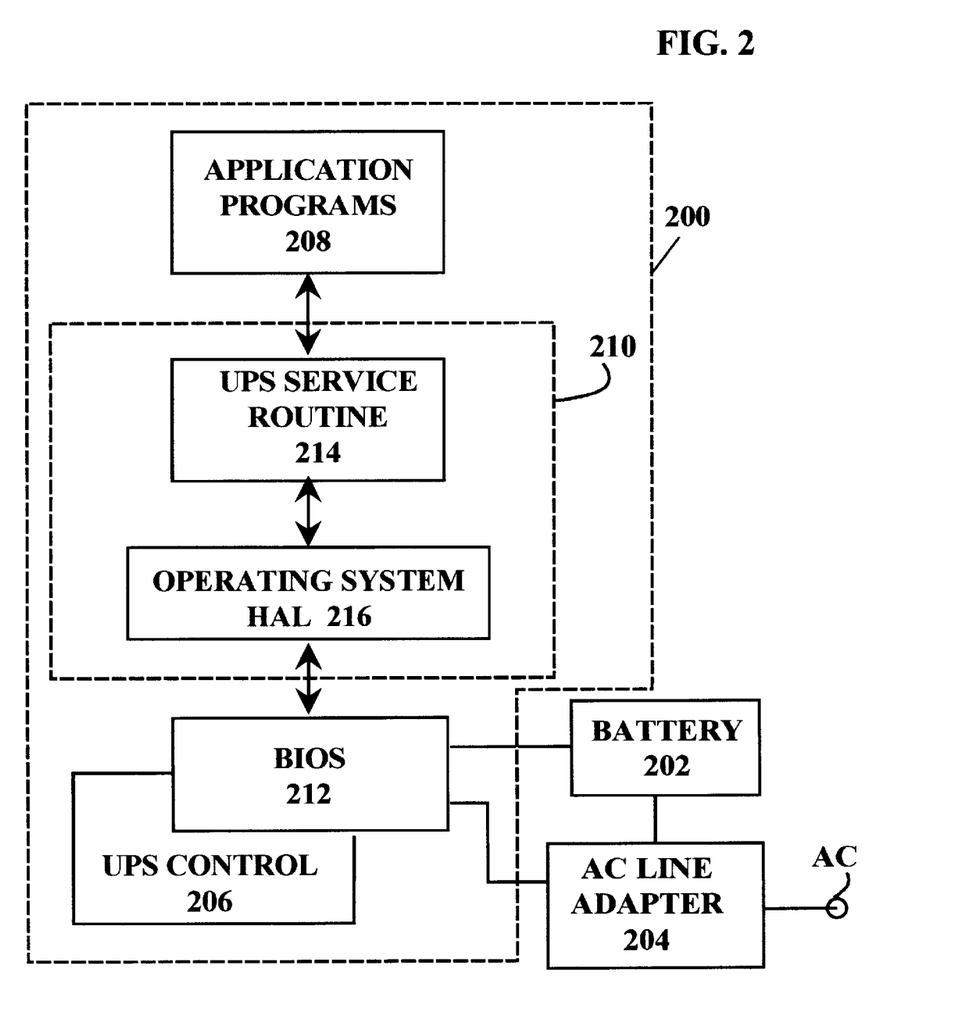
FIG. 2 is a block diagram showing a computer system including an emulated Uninterruptable Power Supply (UPS) in accordance with an embodiment of the present invention.

Referring to FIG. 2, a block diagram illustrates a computer system 200 including an emulated Uninterruptable Power Supply (UPS) in accordance with an embodiment of the present invention. The computer system 200 is connected to a chargeable battery 202 and an AC line adapter 204 to supply power consistently for the operation of the computer system 200. The computer system 200 includes an emulated Uninterruptable Power Supply (UPS) controller 206 for ensuring delivery of a reliable power supply to the computer system 200. The emulated UPS controller 206 includes several software and hardware elements.

Software elements of the emulated UPS controller 206 include various application programs 208, a software driver 210, and a Basic Input/Output System (BIOS) 212. The software driver 210 supplies an interface from the application programs 208 to the BIOS 212 and includes a UPS service routine 214 and a hardware abstraction layer (HAL) 216. The application programs 208 receive data from a UPS and generate signals for controlling a UPS. The software driver 210 is specific to a particular operating system, such as a Windows NT operating system. In various embodiments the software driver 210 may be a generic driver supplied with a particular operating system or a custom driver that is specific to a particular manufacturer's version of a UPS.

Typically, the application programs 208 and the software driver 210 are the same in the emulated UPS controller 206 and in a UPS controller for a system connected to an actual UPS. Usage of existing application programs and software drivers is advantageous for ensuring compatability of operation of off-the-shelf software with emulation of the UPS. However, performance of the emulated UPS may be enhanced considerably if comparability is not essential by supplying additional functions in the application programs 208 or extensions to the UPS service routine 214.

One advantageous enhancement to the UPS service routine 214 is a routine for flexibly setting different triggering actions relating to the battery charge measurements. Different actions may be activated depending on the measured remaining level of battery charge. For example, a 50% battery charge level may be selected to trigger notification the system administrator of the battery condition and selected power-aware applications of the application programs 208. A 25% battery charge level may be selected to trigger notification to all application programs 208. A 5% battery charge level may be selected to activate a system shutdown.

A further advantageous enhancement to the UPS service routine 214 is a routine for suspending the operation of the system at a selected battery charge level, rather than evoking a system shutdown. A suspended condition, the state of the system is preserved but instruction execution is temporarily terminated. The advantage of the suspended condition is that delay for system rebooting is not incurred upon restart. At a selected, more critical battery charge level, a system shutdown is evoked.

Another advantageous enhancement to the UPS service routine 214 is a routine for determining which application programs 208 are currently in use at the time of a potential shutdown condition. The UPS service routine 214 may selectively shut down particular application programs 208 and maintain other, more critical, applications. For example, a modem routine that is currently receiving data may be allowed to continue operation until completed while other operations are suspended or terminated.

Still another advantageous enhancement to the UPS service routine 214 is a routine for suspending operation and waiting for a varying time duration before restarting operation. For example, the time duration of the suspension may be set at a short duration interval for initial low battery conditions and the interval may be extended for each subsequent low battery condition. In another embodiment, the duration of suspension may be set depending on the specific battery charge level so that a higher battery charge level corresponds to a shorter duration of suspension.

Typically, the application programs 208 and the software driver 210 are the same in the emulated UPS controller 206 and in the conventional UPS 100 shown in FIG. 1. The emulated UPS controller 206 is configured by replacing the conventional BIOS 120 with a custom UPS emulation BIOS 212 and by replacing the serial port 118, the serial cable 110 and the actual UPS 101 with BIOS accessing of the chargeable battery 202 and the AC line adapter 204. The UPS emulation BIOS 212 emulates the conventional operation of the serial port 118, emulates the conventional transfer of serial data on the serial cable 110, and emulates the conventional control and monitoring operations of the UPS 101.

The software driver 210 interacts with the UPS emulation BIOS 212 to transfer messages through emulation of a serial port by the UPS emulation BIOS 212. The UPS emulation BIOS 212 emulates the operation of a conventional UPS by detecting changes in the state of the chargeable battery 202 and the AC line voltage. In particular, the UPS emulation BIOS 212 detects the presence or loss of charging current by interrogating signals from the AC line adapter 204. The UPS emulation BIOS 212 similarly detects the presence and status of the battery charge by interrogating the chargeable battery 202. Similarly, the UPS emulation BIOS 212 simulates the condition of signals on the serial cable 110 and the serial port 118. For example, the state of an AC line fail signal is simulated by forcing one of the simulated RS-232 signals to an active state.

Figure 3:
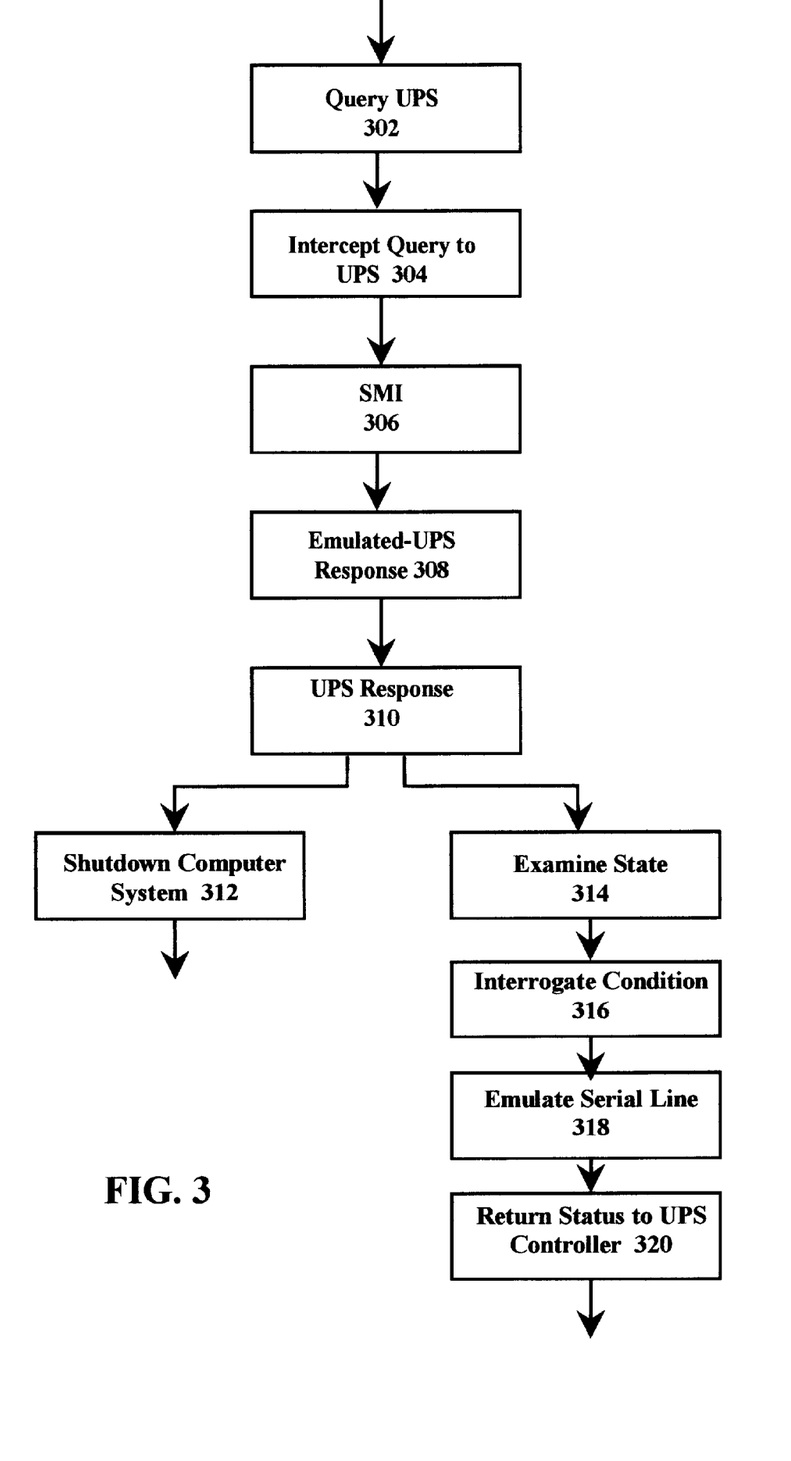
FIG. 3 is a flow chart illustrating high level operations performed by a computer system in conjunction with an emulated UPS controller for requesting action of an emulated UPS.

Referring to FIG. 3, a flow chart illustrates high level operations performed by the computer system 200 in conjunction with the emulated UPS controller 206 in response to a command from an application program 208 requesting a status check of a conventional UPS. An application program 208 initiates a query of the emulated UPS by a call to the software driver 210 in a Query-UPS step 302. The query is directed to a serial port in the manner of a call to an actual UPS. The query is intercepted by the UPS emulation BIOS 212 in an Intercept-Query step 304 and the UPS emulation BIOS 212 responds to the query by entering a System Management Interrupt (SMI) state 306. In the SMI state 306, the UPS emulation BIOS 212 reads the state of signals on a simulated serial port. In the SMI state 306, the BIOS accesses emulated serial signals such as selected signals of emulated RS-232 signals.

The UPS emulation BIOS 212 responds to the UPS request in an Emulated-UPS-Response step 308 by performing a requested action, if appropriate, in UPS-Response step 310. Appropriate UPS actions include, for example, shutting down the computer system 200 in step 312 in response to a request that would shut down an actual UPS if such UPS were connected. Another appropriate UPS action is illustrated by an Examine-State step 314 which calls for an examination of the current state of the chargeable battery 202 and the AC line adapter 204. The UPS emulation BIOS 212 interrogates the chargeable battery 202 and the AC line adapter 204 in response to the request for examination in Interrogate-Condition step 316, updates the state of simulated serial line signals according to the examination of conditions in Emulate-Serial-Line step 318 for communication back to the emulated UPS controller 206 in Return-Status-to-UPS-Controller step 320.

Figure 4:
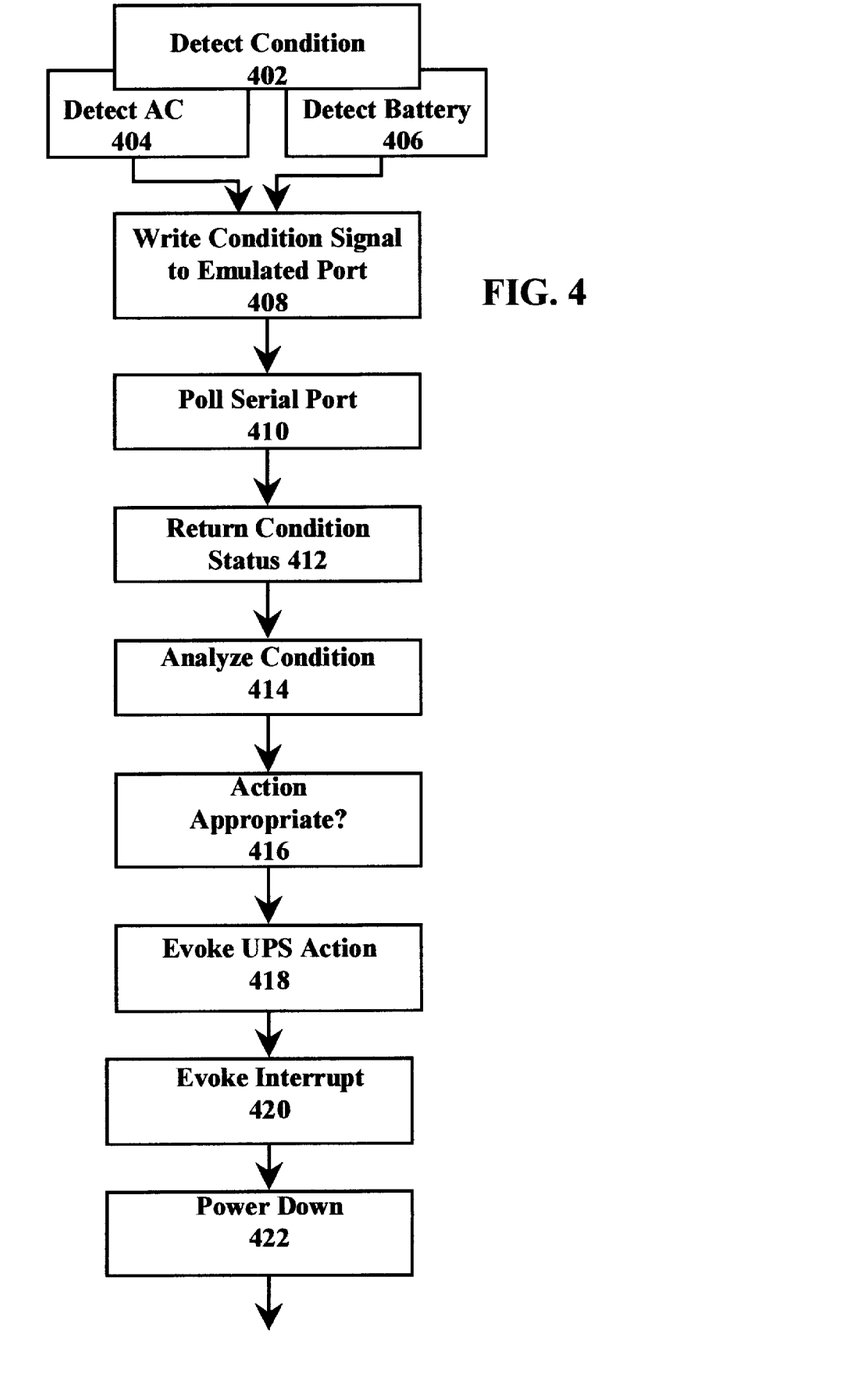
FIG. 4 is a flow chart illustrating high level operations performed by a computer system in conjunction with an emulated UPS controller for receiving an unrequested response from an emulated UPS.

FIG. 4 is a flow chart illustrating high level operations performed by a computer system 200 in conjunction with an emulated UPS controller 206 for receiving an unrequested response from an emulated UPS. The UPS emulation BIOS 212 detects a predetermined condition of the emulated UPS in Detect-Condition step 402. In particular, in Detect-AC step 404 the UPS emulation BIOS 212 detects a low voltage at the AC line adapter 204. In Detect-Battery step 406 the UPS emulation BIOS 212 detects a low condition of the chargeable battery 202. In a Write-Condition-Signal-to-Emulated-Port step 408, the UPS emulation BIOS 212 writes a data value indicative of the UPS condition, such as a low battery condition or a low AC line voltage, to the emulated serial port. The UPS service routine 214 polls the emulated serial port in Poll-Serial-Port step 410 and the UPS emulation BIOS 212 returns the UPS condition value to the UPS service routine 214 in Return-Condition-Status step 412. The UPS service routine 214 analyzes the condition value in Analyze-Condition step 414 invokes an action, if any is appropriate as determined by Action-Appropriate? logic step 416, in Evoke-UPS-Action step 418. In one example of a suitable Evoke-UPS-Action step 418, the UPS service routine 214 evokes an interrupt in Interrupt state 420 and the UPS emulation BIOS 212 intercepts the interrupt message to the emulated serial port and invokes a power-down sequence in Power-Down step 422.

Figure 5:
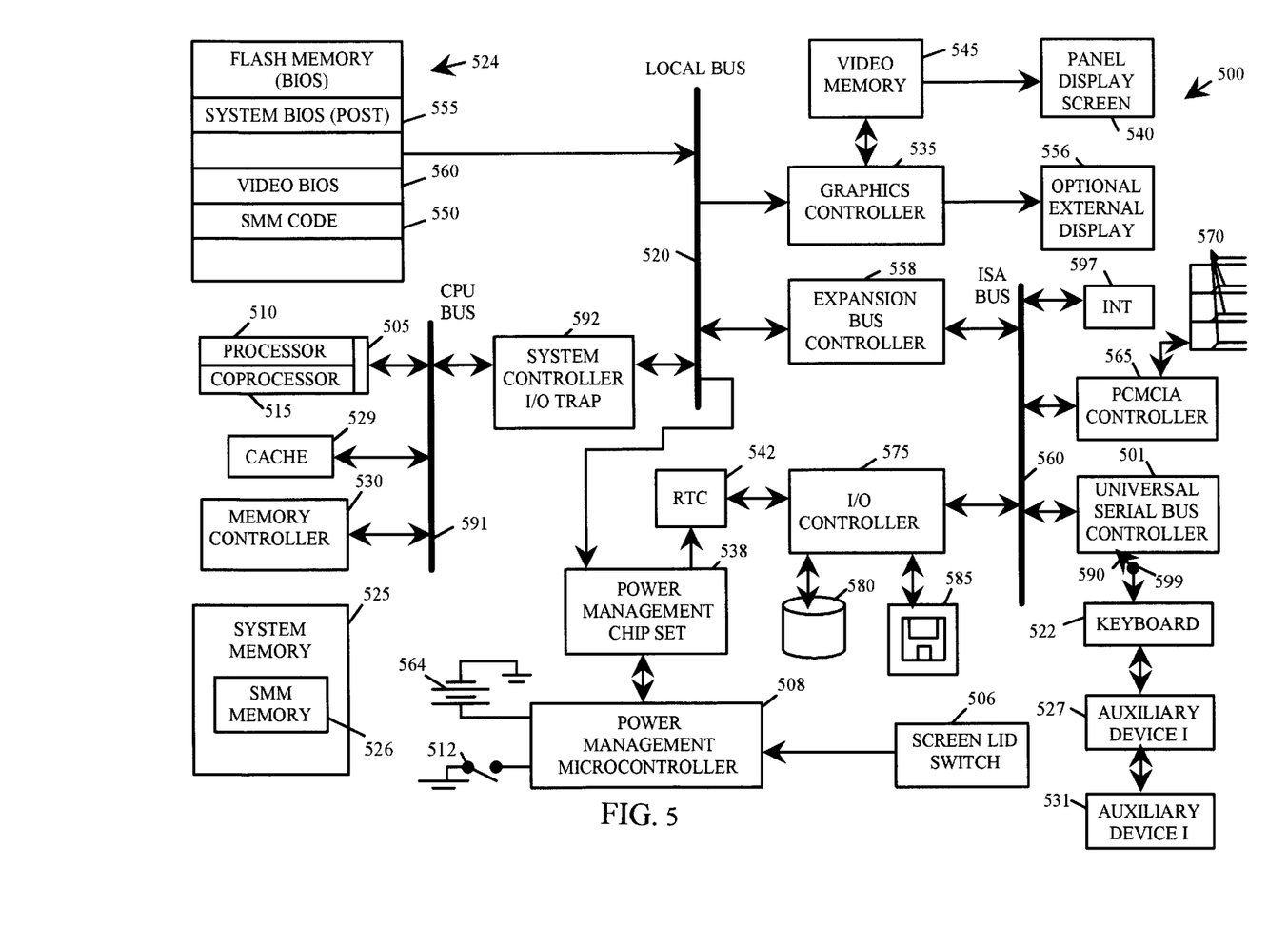
FIG. 5 is a block diagram showing a portable computer system including an emulated UPS controller.

Referring to FIG. 5, a portable computer system 500 includes a microprocessor 505 which may also be called a CPU. In some embodiments, the microprocessor 505 is, for example, an Intel™ Pentium class microprocessor or Intel™ 80486 class microprocessor. The microprocessor 505 has a processor 510 for calculating integer operations and a coprocessor 515 for calculating floating point operations. Microprocessor 505 is connected to a cache 529 and a memory controller 530 via a CPU bus 591. The cache 529 may include both a primary cache (not shown) and a secondary cache (not shown).

A system controller I/O trap circuit 592 connects the CPU bus 591 to a local bus 520. The system controller I/O trap circuit 592 is generally characterized as part of a system controller such as a Pico Power Vesuvious or an Intel™ Mobile Triton chip set. In some embodiments, the system controller I/O trap circuit 592 is programmed to intercept a particular target address or address range. Upon intercepting a target address, the system controller I/O trap circuit 592 asserts an intercept signal indicating that the microprocessor 505 has attempted to access the target address.

In the some embodiments, the intercept signal is connected to an SMI ("system management interrupt") pin of the microprocessor 505, causing the microprocessor 505 to enter system management mode ("SMM").

A main memory 525, typically assembled from a plurality of dynamic random access memory ("DRAM") modules, is connected to the local bus 520 by a memory controller 530. The main memory 525 includes a system management mode memory area which is employed to store converter code to implement conversion methodology embodiments as will be discussed in more detail subsequently.

A Basic Input Output System ("BIOS") memory 524 is connected to local bus 520. A FLASH memory or other nonvolatile memory is used as BIOS memory 524. BIOS memory 524 stores the system code which controls some operations of the portable computer system 500.

A graphics controller 535 is connected to the local bus 520 and to a panel display screen 540. The graphics controller 535 is also connected to a video memory 545 which stores information to be displayed on panel display 540. The panel display 540 is typically an active matrix or passive matrix liquid crystal display ("LCD") although other display technologies may be used as well. Graphics controller 535 is optionally connected to an optional external display or standalone monitor display 556. One example of a suitable graphics controller for usage as the graphics controller 535 is the Western Digital WD90C24A graphics controller.

A bus interface controller or expansion bus controller 558 connects the local bus 520 to an expansion bus 560. In the illustrative embodiment, expansion bus 560 is an Industry Standard Architecture ("ISA") bus although other buses, for example, a Peripheral Component Interconnect ("PCI") bus, may otherwise be used. A PCMCIA ("Personal Computer Memory Card International Association") controller 565 is connected to expansion bus 560. The PCMCIA controller 565 is connected to a plurality of expansion slots 570 to receive PCMCIA expansion cards such as modems, fax cards, communications cards, and other input/output devices. An interrupt request generator 597 is also connected to the ISA bus 560 and issues an interrupt service request over a predetermined interrupt request line after receiving a request signal from the processor 505 requesting issuance of an interrupt.

An I/O controller 575 is connected to ISA bus 560. The I/O controller 575 is interfaced to both an integrated drive electronics ("IDE") hard drive 580 and a floppy diskette drive 585.

A USB controller 501 transfers data to and from the processor 510 via the ISA bus 560. A keyboard 522, auxiliary device I, and auxiliary device II are connected serially to a USB connector 599. This interconnection topology is implemented according the USB technology standard. External devices which include keyboard 522, auxiliary device I, and auxiliary device II communicate with microprocessor 505 via the USB controller 501. Auxiliary devices are typically communication devices such as a mouse, a modem, a joystick, or another computer system. When USB controller 501 receives data from the connected external devices, USB controller 501 issues an interrupt request to the microprocessor 505. The microprocessor 505 interprets the interrupt request as a request for service from a conventional communication interface and attempts to process the interrupt request accordingly. However, a USB servicing routine is executed instead.

The portable computer system 500 includes a power supply 564, such as a battery, which supplies operating power to the many devices of the portable computer system 500. The power supply 564 in the portable computer system 500 is a rechargeable battery, such as a nickel metal hydride ("NiMH") or lithium ion battery. The power supply 564 is connected to a power management microcontroller 508 which operates in the manner of an AC line adapter and controls the distribution of power from power supply 564. More specifically, the power control microcontroller 508 includes a power output terminal 509 connected to a main power plane 514 which supplies power to microprocessor 505. The power management microcontroller 508 is also connected to a power plane (not shown) supplying operating power to panel display 540. In the illustrative embodiment, the power control microcontroller 508 is a Motorola 6805 microcontroller. The power control microcontroller 508 monitors the charge level of the power supply 564 to determine when to charge a battery 564 and when to deny a charging voltage to the battery 564. The power control microcontroller 508 is connected to a main power switch 512 which the user actuates to turn on or shut off the portable computer system 500. While the power control microcontroller 508 powers down other portions of the portable computer system 500 such as hard drive 580 when not in use to conserve power, the power control microcontroller 508 itself is always connected to a source of energy, namely power supply 564.

The portable computer system 500 also includes a screen lid switch 506 or indicator for indicating when the panel display 540 is in the open or closed positions. The panel display 540 is generally located in the typical lid location for "clamshell" types of portable computers such as laptop or notebook computers. The panel display 540 forms an integral part of the lid of the computer and is set in either an open position with the screen accessible for usage or a closed condition for storage and porting.

The portable computer system 500 also includes a power management chip set 538 which includes power management chip models PT86C521 and PT86C22 manufactured by Pico Power. The power management chip set 538 is connected to microprocessor 505 via local bus 520 so that the power management chip set 538 receives power control commands from microprocessor 505. The power management chip set 538 is connected to a plurality of individual power planes supplying power to respective devices in the portable computer system 500 such as the hard drive 580 and floppy diskette drive 585, for example. The power management chip set 538 operates under control of the microprocessor 505 to control the power to the various power planes and devices of the computer. A real time clock ("RTC") 540 is connected to the I/O Controller 575 and the power management chip set 538 so that time events or alarms are transmitted to the power management chip set 538. The real time clock 540 is typically programmed to generate an alarm signal at a predetermined time.

When the portable computer system 500 is turned on or powered up, the system BIOS software stored in non-volatile BIOS memory 524 is copied into main memory 525 to execute instructions more quickly in a technique called "shadowing" or "shadow RAM". At this time, an SMM program code 550 is also copied into the system management mode memory area 526 of main memory 525. The microprocessor 505 executes SMM code 550 after the microprocessor 505 receives a system management interrupt ("SMI") which causes the microprocessor to enter system management mode (SMM) operation. In addition to the SMM code 550, a video BIOS 562 and a system BIOS program code 555 including a power-on self-test (POST) module are stored in the BIOS memory 524 and copied into main memory 525 at power-up. Alternative memory mapping schemes may also be used. For example, SMM code 550 may be stored in fast SRAM memory (not shown) connected to the local/CPU bus 520.

Figure 6:
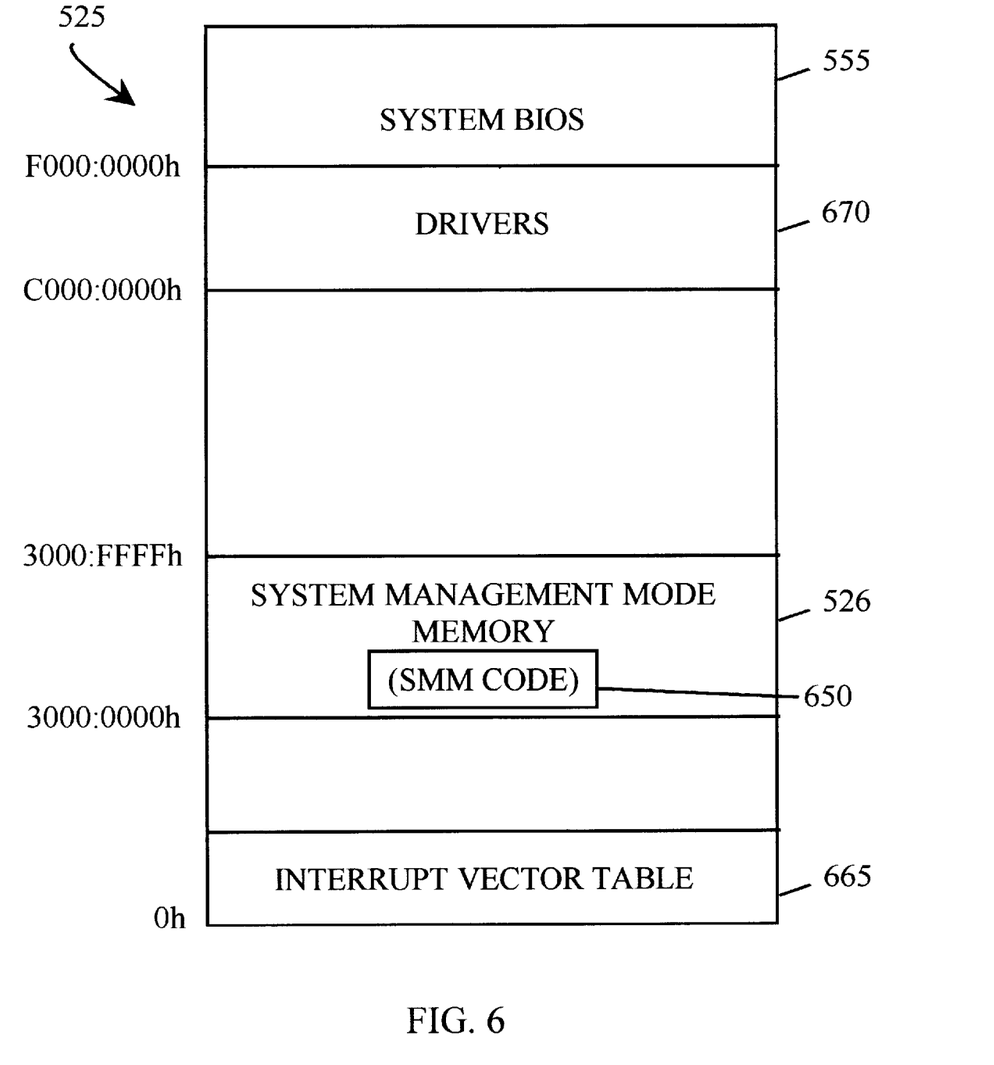
FIG. 6 is a representation of the main memory of the computer system shown in FIG. 5.

Referring to FIG. 6, a diagram of main memory 525 illustrates an embodiment of a SMM code 550 storage in system management mode memory area 526 after the SMM code 550 is loaded into main memory 525. In the illustrative embodiment, SMM memory area 526 resides between main memory addresses 3000:0000h and 3000:FFFFh. Although SMM memory area 526 includes only 64 Kbytes, microprocessors such as the Pentium™ also access data outside system management mode memory area 526. An interrupt vector table 665 is also loaded into main memory 525 at power-up. The interrupt vector table 665 is part of the system BIOS and directs the microprocessor 505 to execute particular interrupt handlers. The main memory 525 includes device drivers 670 including parallel and serial interface drivers. Memory areas not otherwise designated in main memory 525 are available for the operating system and user application programs.

Figure 7A:
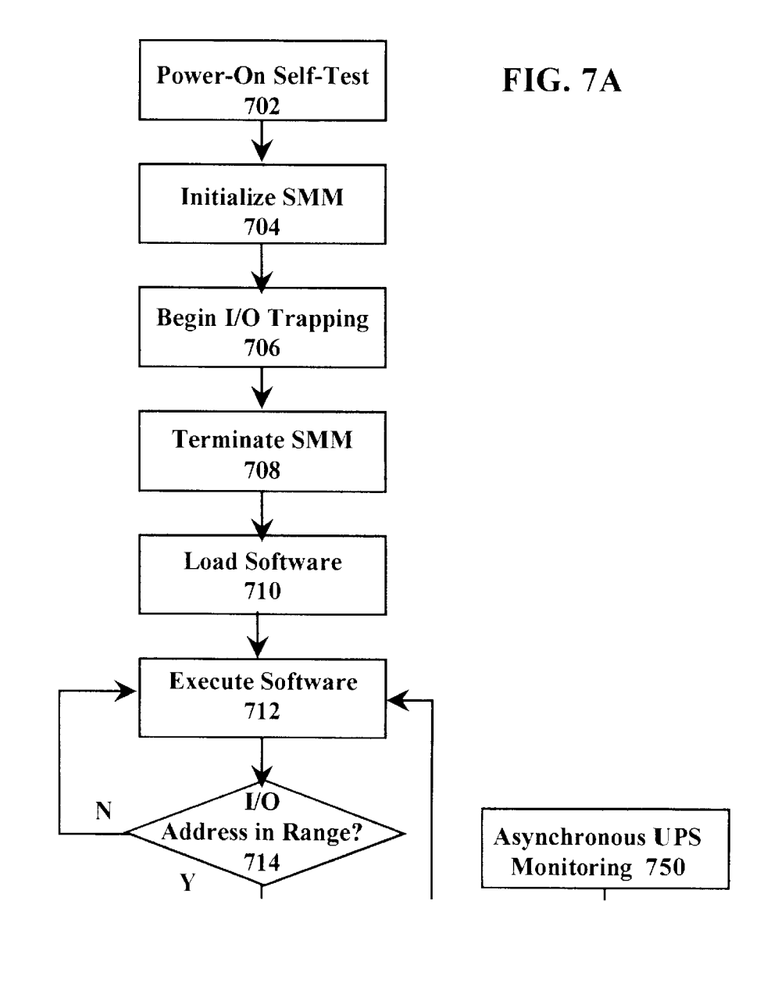
FIGS. 7A and 7B show is a flow chart depicting the process flow of an method for controlling an emulated uninterruptable power source (UPS).
Figure 7B:
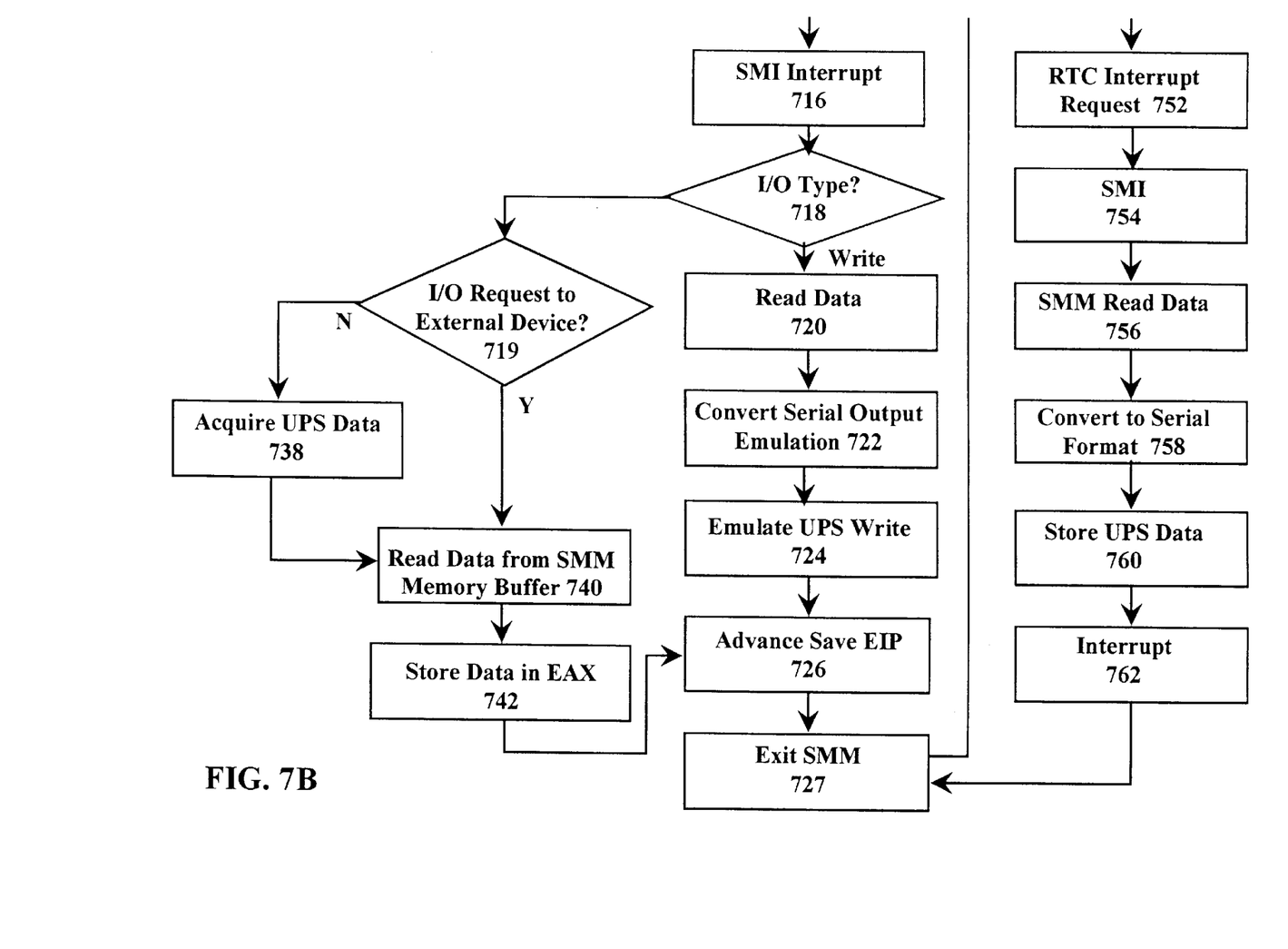

Referring to FIGS. 7A and 7B, a flow chart illustrates a BIOS routine for emulating an uninterruptable power source (UPS) signal 700. Power is applied to the portable computer system 500 and the system BIOS program code 555 is copied into main memory 525. The power-on-self-test ("POST") module of BIOS executes to initialize the portable computer system 500 as shown in a POST step 702. The POST routine includes verification of system hardware functionality such as functionality of the hard disk drive 580, the microprocessor 505 registers, and the floppy disk drive 585. After verification, the SMM code 550 is loaded and initialized in an Initialize-SMM step 704.

After a generic initialization, the SMM code 550 executes a Begin-I/O-Trapping step 706 which initializes I/O trapping of addresses within the range of addresses assigned to the serial port used by the emulated UPS. I/O trapping is implemented by programming the system controller I/O trap circuit 592 to intercept I/O activity relating to addresses within a predetermined address range which is associated with serial interfaces, such as 03F8h, 02F8h, 03E8h, 02E8h, 378h, and 278h. One embodiment of the Begin-I/O-Trapping step 706 uses the SMM code 550 to program the system controller I/O trap circuit 592 to intercept an attempted access by the microprocessor 505 to the interface address range for the purpose of emulating a serial line to an uninterruptable power source (UPS). When system controller I/O trap circuit 592 intercepts a target address, the I/O trap output signal line connected to the SMI pin of microprocessor 505 is activated, causing the microprocessor 505 to enter SMM.

Once I/O trapping is active, SMM is exited in Terminate-SMM step 708 using an explicit Resume-from-System-Management-Mode (RSM) instruction.

The operating system and application software are loaded in a Load-Software step 710.

The operating system and application software code begin executing in an Execute-Software step 712.

I/O trapping is enabled so that the system controller I/O trap circuit 592 traps all I/O addresses within a predetermined range that propagate between local bus 520 and CPU bus 591 in an I/O-Address-in-Range? logic step 714. If the I/O address is outside the predetermined address range, the application code and operating system continue executing. The system controller I/O trap circuit 592 conducts a test to determine whether an application code has attempted to output information to a serial interface address range of 03F8h, 02F8h, 03E8h, 02E8h, 378h, and 278h. The test is performed, for example, by examining any I/O-to-the-Device instruction and comparing the associated instruction destination address with addresses 03F8h, 02F8h, 03E8h, 02E8h, 378h, and 278h. If the intercepted address is within the previously determined range and subsequently programmed by SMM code into system controller I/O trap circuit 592, the system controller I/O trap circuit 592 traps the destination address and issues an SMI activation signal on the SMI pin of microprocessor 505.

Upon the issuance of an SMI, a system management interrupt occurs as indicated in SMI step 716, and the microprocessor 505 stores the current register values including the current code segment ("CS") and extend instruction pointer ("EIP") registers. The microprocessor 505 then begins executing SMM code in system management memory 526.

In Determine-I/O-Type step 718, the UPS emulation program 700 determines whether the I/O instruction to the trapped range from the application code is a WRITE instruction or a READ instruction. The SMM code 550 uses the contents of the EIP register to examine the instruction causing issuance of the SMI. For a WRITE operation indicating transfer of data to an I/O device, the SMM code 550 requests the microprocessor 505 to read the contents of register AL in Read-Data step 720.

A Read-Data step 720 indicates that the contents of register AL are read to determine the I/O information content written by the application program. In Intel™ microprocessors and compatibles, the register EAX contains information to be written to I/O devices including communication interfaces. Register AL contains the least significant byte of information in extended accumulator register EAX. In the illustrative embodiment, register AL contains the complete I/O information content since information written to an I/O device is limited to a single byte width, and only the register AL is to be read by the SMM code 550. In other embodiments, register EAX is read in total or in part according to the width of the data content transferred between an I/O device and a CPU.

After reading the contents of register AL, in a Convert-Serial-Output-Emulation step 722 the SMM code 550 converts the data value from the register AL into a format suitable for emulating the action of an Uninterruptable Power Supply (UPS) in response to a serial port signal directed to a conventional UPS. The data from the register AL has the structure and information content which is indicative of a serial port signal directed to a conventional UPS.

In an Emulate-UPS-Write step 724, the SMM code 550 performs an operation corresponding to the command of the selected serial port signal. Some commands to the UPS include a command to set a predetermined battery set point at which the emulated UPS generates a low battery notification, a command to set a comparator value determining a voltage on the AC power line at which a low AC signal is to be generated, and a command to set an allowed time duration of a low AC line voltage before a low AC signal is generated. For these commands the system BIOS program code 555 sets operational parameters for the commanded values for subsequent monitoring of the battery 564 and the power control microcontroller 508 to determine battery charge and AC line voltage set points and a sampling frequency. In response to a suitable command, the SMM code 550 also activates a BIOS routine for performing asynchronous monitoring of the battery 564 and the power control microcontroller 508.

After performing the function requested by the application, the saved contents of register EIP are advanced according to the length of the requested operation, as indicated in Advance-Saved-EIP step 726 so that the microprocessor 505 executes the next application code instruction once the UPS emulation program 700 returns to the Execute-Software step 712.

A Resume-from-System-Management-Mode instruction is executed to complete operations of the SMM in Exit-SMM step 727. The UPS emulation program 700 executes in repeated loops by branching to the Execute-Software step 712.

Referring again to Determine-I/O-Type? step 718, if SMM code 550 determines that an application code instruction has requested a READ operation directed to the emulated serial port, the SMM code 550 proceeds to an I/O-Request-to-External-Device? logic step 719. The I/O-Request-to-External-Device step 719 is used to determine whether the current I/O instruction has requested data received from an external device or whether the data is to be read is previously generated by an emulated UPS interrupt. If external device input data is requested, Acquire-UPS-Data step 738 measures the battery level and AC line voltage by directly accessing the battery 564 and the power management microcontroller 508 functioning as an AC adapter. In a Convert-Physical-Signal step 735 input data from the emulated UPS acquired by testing the battery level and AC line voltage, is translated into a format suitable for serial port communication. The SMM code 550 stores the read data into register EAX in Store-Data-in-EAX step 742.

If the I/O-Request-to-External-Device step 719 determines that the current I/O instruction has requested data previously generated by an emulated UPS interrupt, SMM code 550 in Read-Data-from-SMM-Memory-Buffer step 740 instructs microprocessor 505 to read the data previously stored in the SMM memory buffer and to store the read data in register EAX in Store-Data-in-EAX step 742. The input data from the emulated UPS is acquired by testing the battery level and AC line voltage and translating the battery and AC line signals into a format suitable for serial port communication in a Convert-Physical-Signal step 736. The UPS emulation program 700 proceeds to Advance-Saved-EIP step 726 so that the microprocessor 505 executes the next application code instruction once the UPS emulation program 700 returns to the Execute-Software step 712. The Resume-from-System-Management-Mode instruction is executed to complete operations of the SMM in Exit-SMM step 727. The application program code retrieves the data from register EAX and the retrieved data is in an expected and recognizable format to the application code.

In an Asynchronous-UPS-Monitoring step 750, the SMM code 550 executes asynchronous monitoring of selected parameters including monitoring of battery charge and AC line voltage and timed according to a selected sampling frequency. The monitoring operation is configured through previous commands to the system BIOS program code 555. The Asynchronous-UPS-Monitoring step 750 performs monitoring of the battery 564 and the power control microcontroller 508 to determine battery charge or AC line voltage set points. While the microprocessor 505 is executing application code or performing other tasks, asynchronous activity of the UPS emulation routine 700 is concurrently executed, when enabled. Asynchronous monitoring of the emulated UPS is typically periodically activated using interrupt signals generated according to counts of the realtime clock 542 with an interrupt service routine set to the address of the Asynchronous-UPS-Monitoring step 750.

The realtime clock 542 issues an interrupt service request to microprocessor 505 as shown in RTC-Interrupt-Request step 752. The system controller I/O trap circuit 592 intercepts the interrupt service request and issues an SMI to the microprocessor 505. The microprocessor 505 responds to the SMI in SMI step 754 and executes the SMM code 550 which determines that an interrupt service request has been received from realtime clock 542. The SMM code 550 then reads the battery charge level from the battery 564 and the AC line voltage from the power control microcontroller 508, as directed by the measurement configuration in SMM-Read-Data step 756. If the battery charge level and the AC line voltage, in combination, indicate a critical low-battery, nonpowered condition, then a Power-Condition-Critical? condition block 758 determines that a critical condition exists and branches to a Generate-Interrupt step 760. The Generate-Interrupt step 760 configures a physical device, such as the emulated serial port, so that the physical device generates an interrupt upon exiting the SMM. Following the Generate-Interrupt step 760, the routine for emulating a UPS 700 is exited via an Exit-SMM step 727. If the Power-Condition-Critical? condition block 758 determines that the power condition is not critical, the routine for emulating a UPS 700 immediately branches to the Exit-SMM step 727.

While the invention has been described with reference to various embodiments, it will be understood that these embodiments are illustrative and that the scope of the invention is not limited to them. Many variations, modifications, additions and improvements of the embodiments described are possible. For example, although the disclosed system is based on a portable computer, other types of computers such as desktops, computer-aided design (CAD) systems, computer-aided manufacturing (CAM) systems, workstations, and the like may also be used so long as these systems include a battery and AC line adapter. Furthermore, although the described system utilizes a Windows NT operating system, this description is for exemplary purposes only and any other operating system that is suitable for usage with a UPS system may also be used.

What is claimed is:

1. A computer system comprising:
   a portable computer capable of executing application programs;
   a processor contained within the portable computer and operating as an executing processor of the portable computer;
   rechargeable battery contained within the portable computer and coupled to the processor for supplying operating power to the processor;
   a power input terminal for connection to an external line power source, the power input terminal coupled to the processor for supplying operating power from the line power source to the processor and coupled to the rechargeable battery for charging the rechargeable battery; and
   an uninterruptable power supply (UPS) software routine that executes concurrently with the executable application programs on the processor so that the portable computer emulates operation of a stand-alone UPS controller device concurrently with execution of the executable application programs.

2. A computer system according to claim 1 wherein the UPS software routine further includes:
   a computable executable routine that generates a signal indicative of a battery status and communicates the signal indicative of the battery status to the processor; and
   a computable executable routine that generates a signal indicative of a line power status and communicates the signal indicative of the line power status to the processor.

3. A computer system according to claim 2, wherein:
   the computable executable routine that communicates the signal indicative of the battery status and the computable executable routine that communicates the signal indicative of the line power status are computable executable routines that emulate a serial interface.

4. A computer system according to claim 2, wherein the UPS software routine further includes:
   a computable executable routine that terminates power to the computer system.

5. A computer system according to claim 4 wherein the UPS software routine further includes:
   a UPS service routine for executing on the processor and further including:
      a computable executable routine that receives the signal indicative of the battery status and that receives the signal indicative of the power line status; and
      a computable executable routine that sends a signal to the UPS software routine declarative of a command to terminate power to the computer system.

6. A computer system according to claim 2, wherein the UPS software routine further includes:
   a computable executable routine that selectively terminates power to the computer system; and
   a computable executable routine that selectively suspends operation of the processor.

7. A computer system according to claim 6 wherein the UPS software routine further includes:
   a UPS service routine for executing on the processor and further including:
      a computable executable routine that receives the signal indicative of the battery status and that receives the signal indicative of the power line status;
      a computable executable routine that selectively terminates applications executing on the processor;
      a computable executable routine that selectively sends a signal to the UPS software declarative of a command to suspend operation of the processor; and
      a computable executable routine that selectively sends a signal to the UPS software routine declarative of a command to terminate power to the computer system.

8. A computer system according to claim 1 wherein the UPS software routine is a computable executable routine that executes from a Basic Input/Output System (BIOS).

9. A computer system according to claim 1, wherein the UPS software routine further includes:
   a computable executable routine that measures battery charge and determines a remaining level of battery charge in comparison to an initial level of battery charge; and
   a computable executable routine that selectively responds to the remaining level of battery charge.

10. A computer system according to claim 9, wherein the computable executable routine that selectively responds to the remaining level of battery charge further includes:
   a computable executable routine that selectively triggers notification to a system administrator of the battery condition and selectively triggers a system shutdown response.

11. A computer system according to claim 9, wherein the computable executable routine that selectively responds to the remaining level of battery charge further includes:
   a computable executable routine that selectively triggers notification to a system administrator of the battery condition, selectively triggers a system suspend response, and selectively triggers a system shutdown response depending on criticality of the battery charge level condition.

12. A computer system according to claim 1, wherein the UPS software routine further includes:
   a computable executable routine that identifies application programs which are currently executing at the time of a potential shutdown condition;
   a computable executable routine that determines criticality of the identified executing application programs; and
   a computable executable routine that selectively shuts down some application programs and maintains execution of other application programs based on the determined criticality.

13. A computer system according to claim 1, wherein the UPS software routine further includes:
   a computable executable routine that measures battery charge and determines a remaining level of battery charge in comparison to an initial level of battery charge; and
   a computable executable routine that selectively responds to the remaining level of battery charge by suspending execution of the processor.

14. A computer system according to claim 13, wherein the computable executable routine that selectively responds to the remaining level of battery charge by suspending execution of the processor further includes:
   a computable executable routine that suspends execution of the processor and waits for a selectable time duration before restarting execution of the processor based on the remaining level of battery charge.

15. An article of manufacture comprising:
   a computer usable medium having computable readable code embodied therein that encodes the uninterruptable power supply (UPS) software routine in accordance with claim 1.

16. An uninterruptable power supply (UPS) software routine that is executable on a portable computer capable of executing application programs and emulates operation of a stand-alone UPS device, the UPS software routine for executing on a processor contained within the portable computer and operating as an executing processor of the portable computer, the processor coupled to a rechargeable battery contained within the portable computer for supplying operating power to the portable computer and coupled to a power terminal that is connectable to an external line power source for supplying operating power to the portable computer, the power terminal being coupled to the rechargeable battery for charging the rechargeable battery, the UPS software routine being executable concurrently with the executable application programs and comprising:
   a computable executable routine that executes on the processor of the portable computer concurrently with execution of application programs and generates a signal indicative of a battery status and communicates the signal indicative of the battery status to the processor; and
   a computable executable routine that executes on the processor of the portable computer concurrently with the execution of application programs and generates a signal indicative of a line power status and communicates the signal indicative of the line power status to the processor.

17. A UPS software routine according to claim 16, wherein:
   the computable executable routine that communicates the signal indicative of the battery status and the computable executable routine that communicates the signal indicative of the line power status are computable executable routines that emulate a serial interface.

18. A UPS software routine according to claim 16, further comprising:
   a computable executable routine that terminates power to the computer system.

19. A UPS software routine according to claim 16, wherein:
   the UPS software routine is a computable executable routine that executes from a Basic Input/Output System (BIOS).

20. A UPS software routine according to claim 16, further comprising:
   a computable executable routine that measures battery charge and determines a remaining level of battery charge in comparison to an initial level of battery charge; and
   a computable executable routine that selectively responds to the remaining level of battery charge.

21. A UPS software routine according to claim 20, wherein the computable executable routine that selectively responds to the remaining level of battery charge further includes:
   a computable executable routine that selectively triggers notification to a system administrator of the battery condition and selectively triggers a system shutdown response.

22. A UPS software routine according to claim 21, wherein the computable executable routine that selectively responds to the remaining level of battery charge further includes:
   a computable executable routine that selectively triggers notification to a system administrator of the battery condition, selectively triggers a system suspend response, and selectively triggers a system shutdown response depending on criticality of the battery charge level condition.

23. A UPS software routine according to claim 16, further comprising:
   a computable executable routine that identifies application programs which are currently executing at the time of a potential shutdown condition;

a computable executable routine that determines criticality of the identified executing application programs; and a computable executable routine that selectively shuts down some application programs and maintains execution of other application programs based on the determined criticality.

24. A UPS software routine according to claim 16, further comprising:

a computable executable routine that measures battery charge and determines a remaining level of battery charge in comparison to an initial level of battery charge; and a computable executable routine that selectively responds to the remaining level of battery charge by suspending execution of the processor.

25. A UPS software routine according to claim 24, wherein the computable executable routine that selectively responds to the remaining level of battery charge by suspending execution of the processor further includes:

a computable executable routine that suspends execution of the processor and waits for a selectable time duration before restarting execution of the processor based on the remaining level of battery charge.

26. An article of manufacture comprising:

a computer usable medium having computable readable code embodied therein that encodes the uninterruptable power supply (UPS) software routine in accordance with claim 16.

27. A computer system comprising:

a portable computer capable of executing application programs;

a processor contained within the portable computer and operating as an executing processor of the portable computer;

a rechargeable battery contained within the portable computer and coupled to the processor for supplying operating power to the processor;

a power input terminal for connection to an external line power source, the power input terminal coupled to the processor for supplying operating power from the line power source to the processor and coupled to the rechargeable battery for charging the rechargeable battery; and an uninterruptable power supply (UPS) software routine that executes concurrently with the executable application programs on the processor so that the portable computer emulates operation of a stand-alone UPS device, the UPS software routine including:
  a UPS service routine; and
  a UPS emulation routine that executes concurrently with the executable application programs and interfaces to the rechargeable battery and interfacing to the line power source.

28. A computer system according to claim 27 wherein the UPS emulation routine further includes:

a computable executable routine that generates a signal indicative of a battery status and communicates the signal indicative of the battery status to the processor; and a computable executable routine that generates a signal indicative of a line power status and communicates the signal indicative of the line power status to the processor.

29. A computer system according to claim 28, wherein:

the computable executable routine that communicates the signal indicative of the battery status and the computable executable routine that communicates the signal indicative of the line power status are computable executable routines that emulate a serial interface.

30. A computer system according to claim 28, wherein the UPS emulation routine further includes:

a computable executable routine that terminates power to the computer system.

31. A computer system according to claim 30 wherein the UPS service routine further includes:

a computable executable routine that receives the signal indicative of the battery status and that receives the signal indicative of the power line status; and a computable executable routine that sends a signal to the UPS software routine declarative of a command to terminate power to the computer system.

32. A computer system according to claim 28, wherein the UPS emulation routine further includes:

a computable executable routine that selectively terminates power to the computer system; and a computable executable routine that selectively suspends operation of the processor.

33. A computer system according to claim 27 wherein the UPS service routine further includes:

a computable executable routine that receives the signal indicative of the battery status and that receives the signal indicative of the power line status;

a computable executable routine that selectively terminates applications executing on the processor;

a computable executable routine that selectively sends a signal to the UPS software declarative of a command to suspend operation of the processor; and a computable executable routine that selectively sends a signal to the UPS software routine declarative of a command to terminate power to the computer system.

34. A computer system according to claim 27 wherein the UPS emulation routine is a computable executable routine that executes from a Basic Input/Output System (BIOS).

35. A computer system according to claim 27, wherein the UPS software routine further includes:

a computable executable routine that measures battery charge and determines a remaining level of battery charge in comparison to an initial level of battery charge; and a computable executable routine that selectively responds to the remaining level of battery charge.

36. A computer system according to claim 35, wherein the computable executable routine that selectively responds to the remaining level of battery charge further includes:

a computable executable routine that selectively triggers notification to a system administrator of the battery condition and selectively triggers a system shutdown response.

37. A computer system according to claim 35, wherein the computable executable routine that selectively responds to the remaining level of battery charge further includes:

a computable executable routine that selectively triggers notification to a system administrator of the battery condition, selectively triggers a system suspend response, and selectively triggers a system shutdown response depending on criticality of the battery charge level condition.

38. A computer system according to claim 27, wherein the UPS software routine further includes:

a computable executable routine that identifies application programs which are currently executing at the time of a potential shutdown condition;

a computable executable routine that determines criticality of the identified executing application programs; and a computable executable routine that selectively shuts down some application programs and maintains execution of other application programs based on the determined criticality.

39. A computer system according to claim 27, wherein the UPS software routine further includes:

a computable executable routine that measures battery charge and determines a remaining level of battery charge in comparison to an initial level of battery charge; and a computable executable routine that selectively responds to the remaining level of battery charge by suspending execution of the processor.

40. A computer system according to claim 39, wherein the computable executable routine that selectively responds to the remaining level of battery charge by suspending execution of the processor further includes:

a computable executable routine that suspends execution of the processor and waits for a selectable time duration before restarting execution of the processor based on the remaining level of battery charge.

41. An article of manufacture comprising:

a computer usable medium having computable readable code embodied therein that encodes the uninterruptable power supply (UPS) software routine in accordance with claim 27.

42. A method of operating a portable computer comprising:

operating a portable computer including executing application programs, the portable computer containing an internal rechargeable battery and having a power terminal for connection to an external power source; and emulating operation of an uninterruptable power supply (UPS) concurrently with the executable application programs; and maintaining continuous operation of the portable computer throughout occurrences of brownouts and supply line dropouts via the emulating operation.

43. A method according to claim 42, further comprising:

measuring battery charge;

determining a remaining level of battery charge in comparison to an initial level of battery charge; and selectively responding to the remaining level of battery charge.

44. A method according to claim 43 further comprising:

selectively triggering notification to a system administrator of the battery condition; and selectively triggering a system shutdown response.

45. A method according to claim 43 further comprising:

selectively triggering notification to a system administrator of the battery condition;

selectively triggering a system suspend response; and selectively triggering a system shutdown response depending on criticality of the battery charge level condition.

46. A method according to claim 42 further comprising:

identifying application programs which are currently executing at the time of a potential shutdown condition;

determining criticality of the identified executing application programs; and selectively shutting down some application programs and maintaining execution of other application programs based on the determined criticality.

47. A method according to claim 42 further comprising:

measuring battery charge;

determining a remaining level of battery charge in comparison to an initial level of battery charge; and selectively responding to the remaining level of battery charge by suspending execution of the processor.

48. A method according to claim 47 further comprising:

suspending execution of the processor;

waiting for a selected time duration before restarting execution of the processor selected based on the remaining level of battery charge.

* * * * *